United States Patent [19]
McMillen

[11] Patent Number: 5,897,119
[45] Date of Patent: Apr. 27, 1999

[54] FLOATING WIPER SEAL ASSEMBLY

[75] Inventor: Ivan L. McMillen, Farmington, N.Y.

[73] Assignee: Garlock, Inc., Palmyra, N.Y.

[21] Appl. No.: 08/844,445

[22] Filed: Apr. 18, 1997

[51] Int. Cl.⁶ ........................................ F16J 15/32
[52] U.S. Cl. .................... 277/562; 277/564; 277/566
[58] Field of Search .......................... 277/560, 562, 277/564, 565, 566, 579; 384/477, 484

[56] References Cited

U.S. PATENT DOCUMENTS

| | | | |
|---|---|---|---|
| 2,994,571 | 8/1961 | Peras | 277/565 X |
| 3,494,625 | 2/1970 | Sweger | 277/565 X |
| 3,854,737 | 12/1974 | Gilliam | 277/566 |
| 3,866,923 | 2/1975 | Gorman . | |
| 4,280,741 | 7/1981 | Stoll | 277/565 X |
| 4,298,203 | 11/1981 | Hölzer et al. . | |
| 4,553,760 | 11/1985 | Reed et al. . | |
| 4,618,153 | 10/1986 | Nilsson . | |
| 4,709,932 | 12/1987 | Edlund et al. . | |
| 4,819,952 | 4/1989 | Edlund . | |
| 4,869,514 | 9/1989 | Bogdanovic . | |
| 5,118,206 | 6/1992 | Otto | 384/477 |
| 5,139,274 | 8/1992 | Oseman | 277/560 X |
| 5,205,568 | 4/1993 | Stoll et al. . | |
| 5,271,629 | 12/1993 | Dahlhaus et al. . | |
| 5,288,086 | 2/1994 | Kiesel . | |
| 5,303,935 | 4/1994 | Saksun . | |
| 5,346,230 | 9/1994 | Schumacher et al. . | |
| 5,380,016 | 1/1995 | Reinsma et al. . | |
| 5,503,408 | 4/1996 | Hemann et al. . | |
| 5,556,112 | 9/1996 | Brandt . | |

*Primary Examiner*—Anthony Knight
*Assistant Examiner*—Gary Grafel
*Attorney, Agent, or Firm*—Cummings & Lockwood

[57] ABSTRACT

A floating wiper seal assembly for sealingly engaging a reciprocating shaft within a hydraulic pump or cylinder housing. The seal assembly includes a generally cylindrical elastomeric seal body configured for reception within a cylindrical bore of the housing. An axial bore extends through the seal body for receiving the reciprocating shaft. A pair of opposed flexible annular lips extend radially inwardly from an interior surface of the axial bore for wiping and sealingly engaging the reciprocating shaft, and at least two flexible annular rings extend radially outwardly from the seal body for sealingly engaging an interior surface of the cylindrical bore. The elastomeric seal body is dimensioned and configured to float freely within the cylindrical bore in both a radial and axial direction upon flexure of the annular lips and annular sealing rings in response to reciprocating movement of the shaft while maintaining sealing engagement with the shaft and the pump or cylinder housing, respectively.

20 Claims, 4 Drawing Sheets

FLOATING WIPER SEAL ASSEMBLY

BACKGROUND OF THE INVENTION

1. Field of the Invention:

The subject invention relates to sealing devices, and more particularly, to a floating wiper seal assembly for a reciprocating shaft in a hydraulic pump or cylinder that can accommodate shaft-to-bore misalignment.

2. Description of the Prior Art:

In a hydraulic system, fluid pressure is converted to linear force by applying the fluid pressure to an end of a reciprocating shaft or piston which slides axially in a matching bore of a cylindrical housing or crankcase. A connecting rod extends from the piston out through the power end of the bore. To avoid loss of fluid and fluid pressure from the system, it is necessary to provide a sealing device between the connecting rod and the power end of the bore.

In some applications, e.g., in large earth moving vehicles, such as tractors, loaders, off-highway trucks, and the like which employ hydraulic jacks and/or suspension struts, piston cylinders are exposed to all varieties of dirt, debris, moisture and other abrasive contaminants. It is well known that such contaminants are injurious to the seals, bearings and other components of such jacks or struts. Accordingly, it has been the practice to use rod wipers to wipe the piston rod clean as it is retracted into the cylinder so as to reduce to the maximum extent possible the amount of contaminants reaching the seals and bearings. U.S. Pat. Nos. 3,866,923 and 4,618,153 both disclose rod wipers for this purpose.

In order to satisfactorily perform the desired wiping function, such wipers must remain in continuous wiping contact with the piston rod as it moves back and forth through the wiper. Also, the wiping contact must be applied with a sufficient radial force to ensure the desired cleaning action on the rod. These tasks may be complicated where extreme side loads are exerted on the rods of hydraulic cylinders in operation, which causes the rapid radial displacement of the rod relative to the wiper as the rod moves axially in and out of the cylinder. Prior wipers have been made of rubber to attain this necessary resiliency and responsiveness. However, rubber is relatively soft and susceptible to a high wear rate. Harder plastic materials, such as polyurethane for instance, exhibit much greater wear resistance.

Unfortunately, two problems exists with the use of such harder materials. First, harder materials have lower creep resistance. This allows the radial force they exert on the rod to lessen over time, allowing debris to get past the wiper. Second, they have a much lower response rate, particularly at extremely low temperatures, due to their higher flex modules and decreased resiliency at extremely low temperatures. In other words, such materials do not respond quickly enough to afford their movement with the rapid radial displacements of the rod. This causes the wiper to leave contact with the rod and also allows debris to get past the wiper.

Further, conventional seals such as outer periphery lip type oil seals with or without substantial wiping contact, as well as V-ring or braided packing sets which are also currently used depending upon the application, provide less than satisfactory service. In most cases, the reciprocating shafts or piston rods are misaligned or exhibit cycloidal side movement as they pass through the sealing device at high cycling rates. These conventional seals are rigidly mounted in a seal housing to provide a static seal around their outer periphery and their bodies cannot flex enough to permit their sealing surfaces or lips to remain in constant dynamic sealing and where applicable, on their inner periphery, in wiping contact with the shaft. The result is oil and/or contamination leakage. Examples of such lip seals are shown in U.S. Pat. Nos. 5,303,935, 5,205,568 and 5,288,086.

Other seals having a convoluted (flexible) cross-section design and a bearing insert to help the sealing surface follow the shaft have shown improved service in a few cases. An example of this type seal is shown in U.S. Pat. No. 4,553,760. However, the use of such seals is limited as there often is not enough cross-sectional space to design a convoluted body that will provide enough flexibility.

The present invention is directed to an improved highly flexible wiper seal device for use in a hydraulic pump system to effectively seal the power side of the oil crankcase or reservoir of the pump during the power stroke, while wiping the reciprocating shaft of the pump system on the return stroke to preclude contamination of the system with debris.

SUMMARY OF THE INVENTION

The subject invention is directed to a floating wiper seal assembly for sealingly engaging a reciprocating shaft within a housing, and more particularly, for sealingly engaging a reciprocating piston within a hydraulic cylinder housing. The seal assembly of the subject invention includes a generally cylindrical elastomeric body, preferably formed from polyurethane, or a similar hard plastic material, and is dimensioned and configured for reception within a cylindrical bore of the pump housing. An axial bore extends through the elastomeric seal body for receiving and accommodating the reciprocating shaft. A pair of opposed flexible annular lips extend radially inwardly from an interior surface of the axial bore for wiping and sealingly engaging the reciprocating shaft, and at least two flexible annular sealing rings extend radially outwardly from the body for sealingly engaging an interior surface of the cylindrical bore. The lips and the sealing rings are integrally formed with the elastomeric seal body.

In a preferred embodiment of the subject invention, an annular bearing insert is associated with the axial bore of the elastomeric body for guiding and supporting the reciprocating shaft. The bearing is preferably constructed from a lubricious metallic material, such as, for example, bronze, and it is embedded in and bonded to the elastomeric body between the opposed annular lips. Alternatively, non-metallic bearing materials, such as, for example, polytetrafluoroethylene (PTFE) or glass-filled Nylon may be utilized.

In a preferred embodiment of the subject invention, the opposed annular lips extend radially inwardly from an inner circumference of the axial bore of the elastomeric body at an angle with respect to to the longitudinal axis of the seal body, and the annular sealing rings extend radially outwardly from the elastomeric seal body at the same angle to the longitudinal axis of the seal body. In one embodiment, the sealing rings are disposed at the same acute angle with respect to one direction of the longitudinal axis of the elastomeric body, and in another embodiment the annular sealing rings are disposed at an obtuse angle with respect to the same direction of the longitudinal axis of the elastomeric body.

In accordance with the subject invention, the flexible sealing rings permit radial flexibility as well as some axial cant such that the seal body and the wiper lips can float radially as they are guided by the bearing insert riding tightly on the shaft. Furthermore, the seal body is dimensioned and configured so that some spacing is left between the sides of the elastomeric body and the reception bore of the pump or cylinder housing to enable slight axial movement and canting of the seal so that it truly is free-floating and will maintain effective sealing contact with both the shaft and the pump housing at all times, while continuously providing wiping contact with the shaft.

Further features of the floating wiper seal assembly of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use a floating wiper seal constructed in accordance with the subject invention, a preferred embodiment thereof will be described in detail hereinbelow with reference to the drawings wherein.

DETAILED DESCRIPTION OF THE PREFERRED EMBODIMENT

Figure 1:
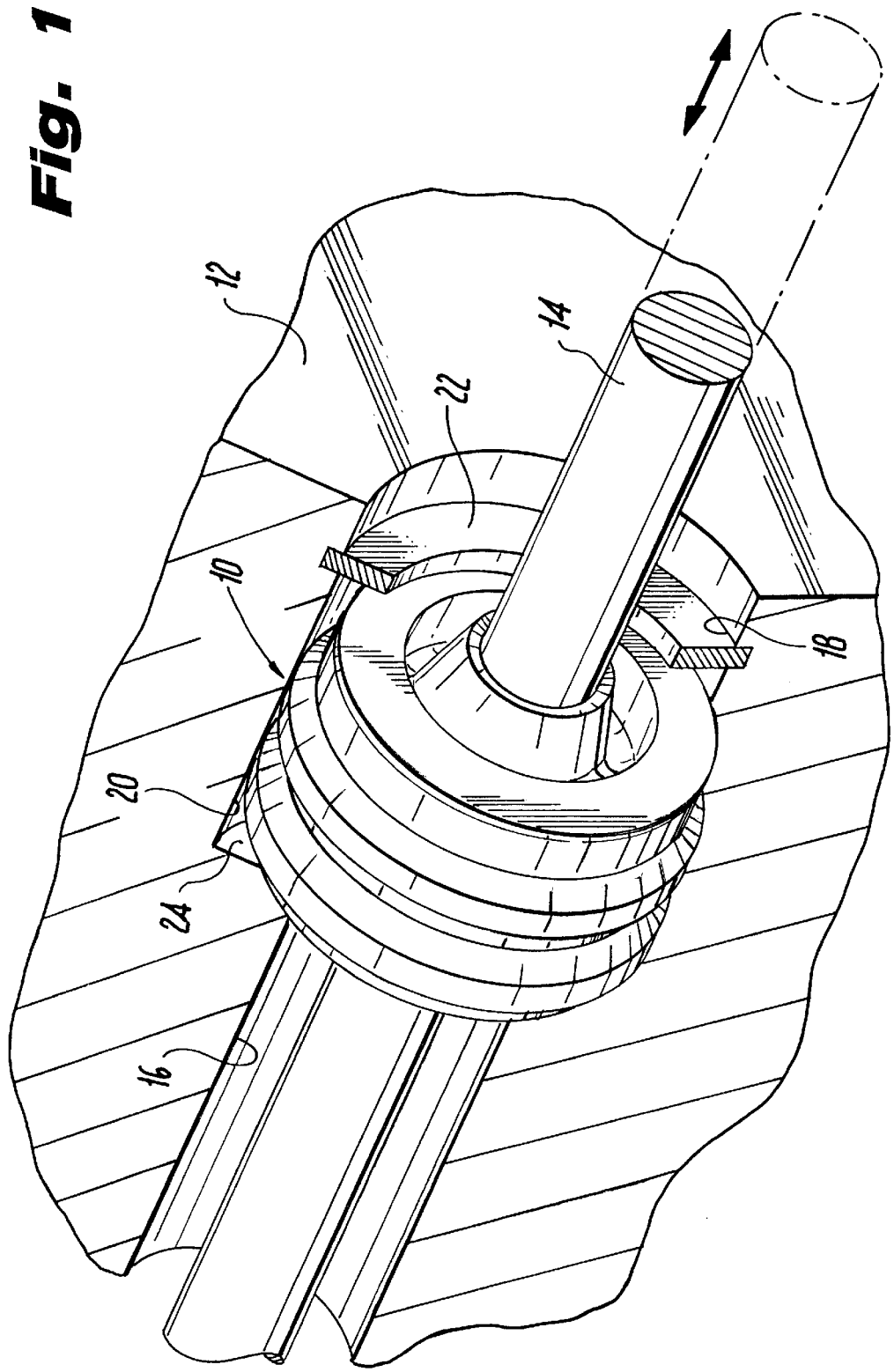
FIG. 1 is aperspective view of a floating wiper seal assembly constructed in accordance with a pre, red embodiment of the subject invention, mounted within a reception bore of a pump housing shown in a cross-section, and having a reciprocating shaft extending therethrough.

Referring now to the drawings, wherein like reference numerals indicate similar structural elements of the subject invention, there is illustrated in FIG. 1 a floating wiper seal assembly constructed in accordance with a preferred embodiment of the subject invention and designated generally by reference numeral 10. In brief, wiper seal assembly 10 is employed in the pump housing 12 of a hydraulic system to sealingly engage a reciprocating shaft 14 moving within a matching bore 16 of slightly greater diameter and thereby seal low pressure oil within the power end of the pump housing while preventing unwanted contaminants and debris from entering the housing from the exterior environment.

Figure 2:
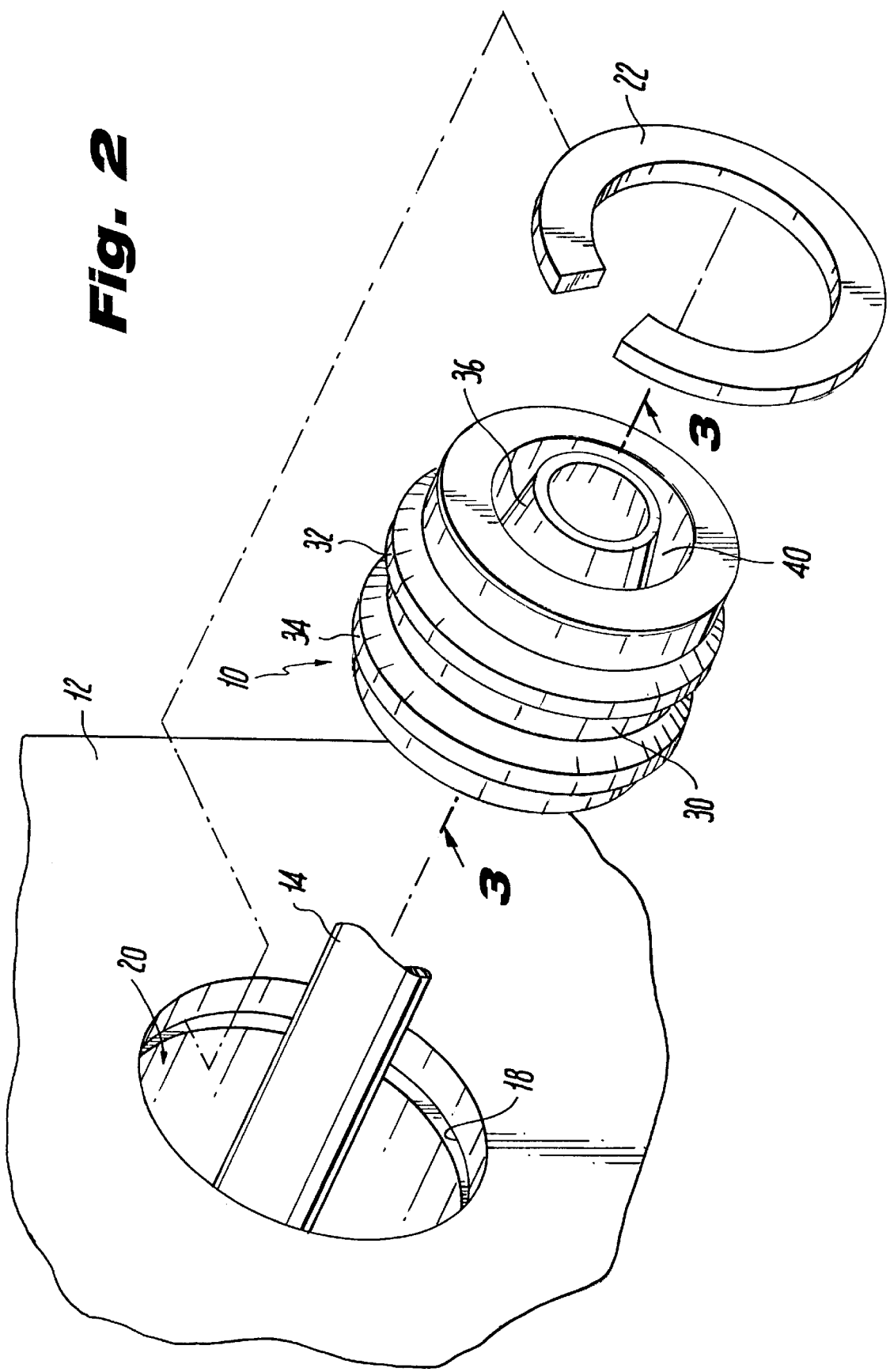
FIG. 2 is a perspective view of the seal assembly separated from the pump housing and illustrating the split keeper ring used to secure the seal assembly within the reception bore.

As best seen in FIGS. 1 and 2, a generally cylindrical reception bore 20 is formed adjacent the power end of pump housing 12 for accommodating seal assembly 10. An annular groove 18 is formed adjacent the forward end of reception bore 20 for accommodating a split retaining ring 22 which is snapped into the groove to effectively limit the longitudinal travel of seal assembly 10 within the reception bore 20. In actuality, the retaining ring 22 and the rearward wall 24 of reception bore 20 define the limited area within which sealing assembly 10 is permitted to move in accordance with the subject invention to accommodate both axial and radial movement of the sealing assembly in response to reciprocating movements of shaft 14 during operation.

Figure 3:
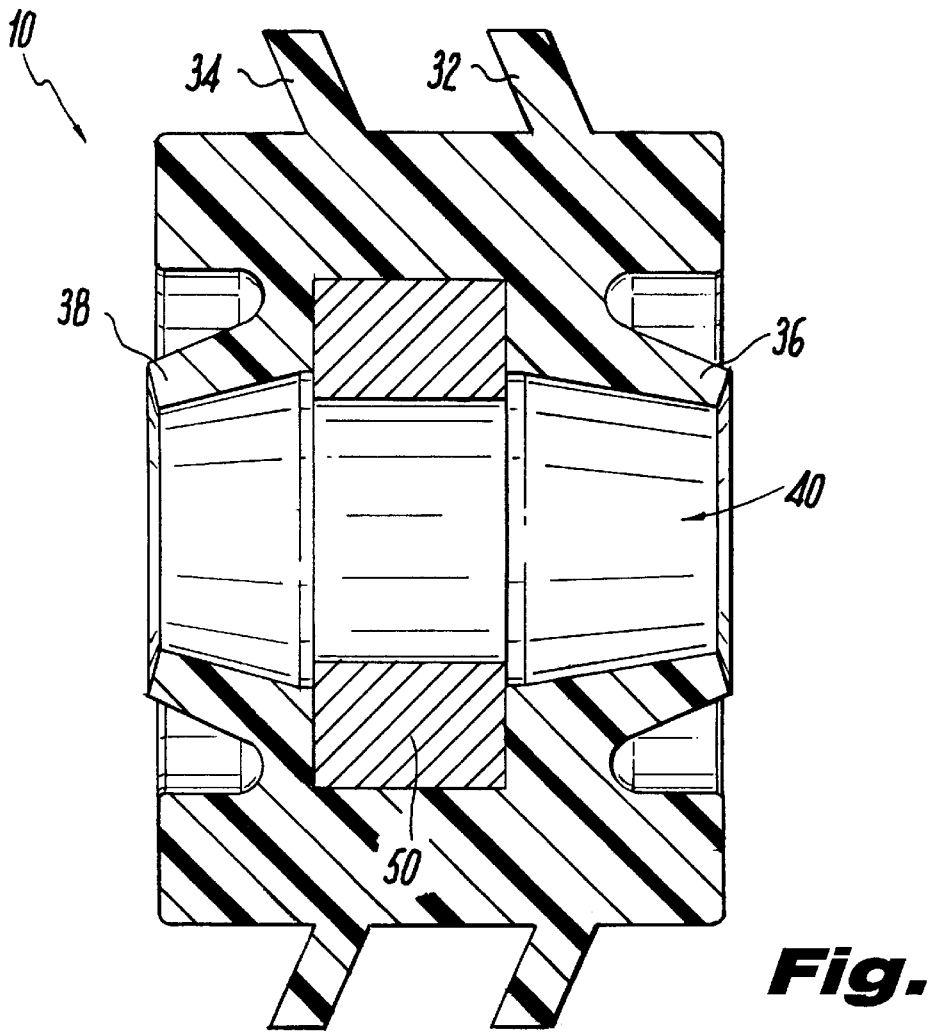
FIG. 3 is a cross-sectional view of the wiper seal assembly of the subject invention taken along line 3—3 of FIG. 2.

Referring now to FIG. 3, seal assembly 10 includes a generally cylindrical body 30 formed from an elastomeric material, and preferably, a hard plastic material such as polyurethane which exhibits high wear resistance during service. A pair of spaced apart compressible annular sealing rings 32 and 34 are formed integral with seal body 30 and extend radially outwardly therefrom to sealingly engage the inner circumferential wall 26 of reception bore 20. As shown, the annular sealing rings 32 and 34 are spaced from either end of the seal body. In operation, sealing sealing rings 32 and 34 effectively float within reception bore 20, in rhythm with the movement of the reciprocating shaft 14, to accommodate any axial misalignment of the shaft with respect to reception bore 20. The elastomeric material from which the body 30 and sealing rings 32 and 34 are formed is specifically designed to compress radially upon eccentric or cycloidal rotational movements of the reciprocating shaft 14, as shown, for example in FIGS. 5 and 6 to maintain sealing engagement with interior surface 26 of reception bore 20 and promote an effective oil seal. Upon relief of the shaft eccentricity, the elastomeric nature of the seal body 30 and fins 32 and 34 cause the seal 10 to return to its initial static condition illustrated, for example, in FIG. 3.

Figure 4:
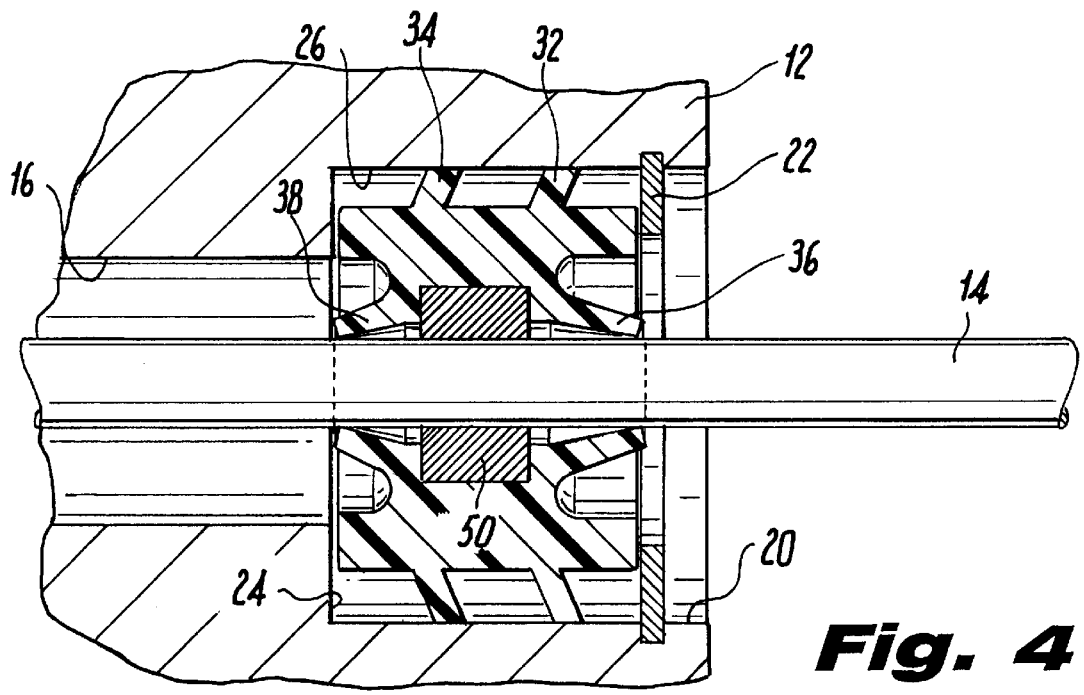
FIG. 4 is a cross-sectional view of another preferred embodiment of the wiper seal assembly of the subject invention located within the reception bore of the pump housing and having a reciprocating shaft extending therethrough.

As illustrated in FIG. 3, sealing rings 32 and 34 are disposed at an obtuse angle with respect to the longitudinal axis of the generally cylindrical seal body 30. However, as illustrated in FIG. 4, sealing rings 32 and 34 can alternatively be disposed at an acute angle with respect to the longitudinal axis of seal body 30 when viewed in the same direction of the axis. The specific angle and/or orientation of the sealing rings will depend upon the application and./or environment within which the sealing device 10 is employed. Furthermore, those skilled in the art will readily appreciate that the number of annular sealing rings provided on the seal body can vary in number depending upon the overall axial dimension of the seal body and/or the application in which it is employed.

Figure 5:
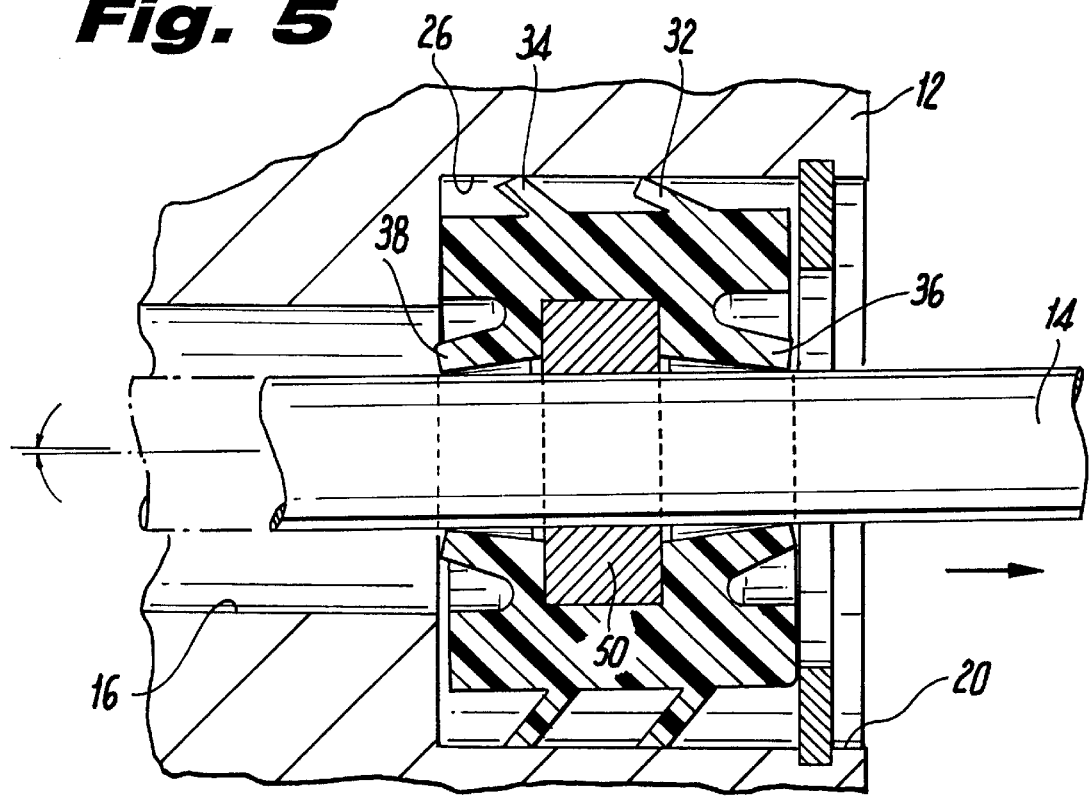
FIG. 5 is a cross-sectional view of the seal assembly of FIG. 1 illustrating a possible canted position of the wiper seal assembly within the reception bore of the pump housing when the shaft is moved in a first axial direction and is slightly misaligned with respect to the axis of the shaft bore.
Figure 6:
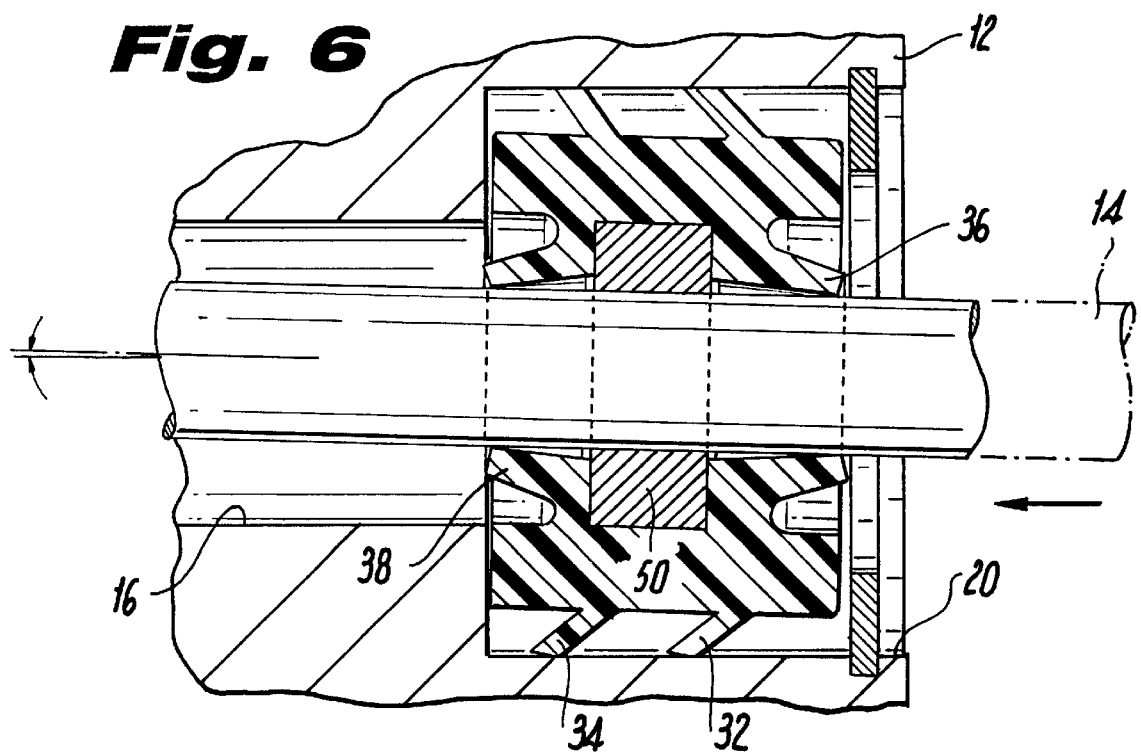
FIG. 6 is a cross-sectional view of the seal assembly of FIG. 1 illustrating a possible canted position the wiper seal assembly within the reception bore of the pump housing when the shaft is moved in a second axial direction and is slightly misaligned with respect to the axis of the shaft bore.

As noted briefly hereinabove, and illustrated specifically in FIGS. 5 and 6, the seal assembly 10 is free-floating and reversible within reception bore 20 and thus it is dimensioned and configured such that sufficient spacing is maintained between the seal body 30 and the rearward wall 24 of reception bore 20 as well as between the seal body 30 and the retaining ring 22 to permit both axial and radial movement of seal body 30 during operation. More particularly, the spacing enables the seal body 30 to cant or angle slightly with respect to the longitudinal axis of reception bore 20, as shown, for example, in FIGS. 5 and 6, if and when shaft 14 becomes axially misaligned with respect to the axis of reception bore 20 due to unequal loading conditions experienced thereby.

Referring once again to FIG. 3, an axial bore 40 extends through seal body 30 for accommodating reciprocating shaft 14. The diameter of axial bore 40 is greater than the diameter of reciprocating shaft 14. A pair of oppositely extending flexible annular wiper lips 36 and 38, formed integral with seal body 30, extend radially inwardly from the circumferential wall on axial bore 40 to sealingly engage the outer periphery of reciprocating shaft 14. Wiper lips 36 and 38 are disposed at opposite obtuse angles to one another with respect to the longitudinal axis of axial bore 40 and form two opposed truncated conical sealing structures adapted and configured to move or flex in conjunction with shaft 14. Those skilled in the art will recognize that relative dimensions of wiper lips 36 and 36 can vary. For example, the forward wiper lip 36 can be formed with a greater lengthwise dimension than the rearward wiper lip 38 to accommodate particular loading conditions, or since the seal body 30 is reversible in reception bore 20, the stubbier and shorter lip 38 can be positioned outboard towards the atmosphere and the longer lip 36 turned inboard towards the oil in the pump or cylinder, providing less flexure for more sustained contact with shaft 14 to remove dust and mud to preclude contamination of the oil chamber where such is an overriding consideration in use of the seal. In accordance with the subject invention, wiper lips 36 and 38 engage shaft 14 at all times during service, i.e., at rest and during operation, so as to prevent the egress of low pressure oil from the hydraulic system and continuously provide wiping contact with the shaft to prevent contaminates and debris from entering the system.

As with the resilient sealing rings 32 and 34 described hereinabove, wiper lips 36 and 38 are formed integral with seal body 30 and can thus flex freely and float radially in rhythm with reciprocation of shaft 14. Accordingly, lips 36 and 38 will maintain their intended sealing function even if the shaft becomes axially misaligned with respect to its bore or exhibits cycloidal (eccentric) side movement as it passes through the seal body at high cycling rates. Furthermore, as noted hereinabove, the spatial relationship between the seal body 30 and reception bore 20, together with the resiliency of the sealing fins 32 and 34, facilitates angular movement of the seal body 30 with respect to the axis of shaft 14 so that the lips 36 and 38 can maintain their proper sealing and wiping function at all times during service.

With continuing reference to FIG. 3, in a preferred embodiment of the subject invention, a bearing insert 50 is molded and/or bonded to seal body 30 between the opposed wiper lips 36 and 38 for being guided by the reciprocating shaft 14 during service. The bearing insert is preferably formed from a metallic bearing material, such as, for, example, bronze or a similar lubricious metal. However, non-metallic bearing materials may be employed such as, for example, polytetrafuoroethylene (PTFE), glass-filled Nylon or a like material. It is also envisioned that the bearing insert may be eliminated from the seal assembly in certain applications. As best seen in FIGS. 5 and 6, the bearing insert 50 is dimensioned and configured to snugly engage shaft 14 and maintain its engagement therewith as seal body 30 is flexed and contorted under varying loading conditions. Those skilled in the art will readily appreciate that the specific position of bearing insert 50 with axial bore 40 can vary. For example, as illustrated in FIG. 3, bearing insert 50 is slightly offset from the geometric center of seal body 30.

Although the floating wiper seal assembly of the subject invention has been described with respect to a preferred embodiment, it is apparent that modifications and/or changes can be made thereto without departing from the spirit and scope of the subject invention as defined by the appended claims.

What is claimed is:

1. A floating wiper seal assembly for sealingly engaging on a reciprocating shaft within a fluid-containing housing comprising:

a) a generally cylindrical elastomeric seal body configured for reception within a cylindrical bore of said housing and having an axial bore extending therethrough for receiving said reciprocating shaft;

b) a pair of opposed flexible annular lips extending radially inwardly from an interior surface of said axial bore for wiping and sealingly engaging said reciprocating shaft; and c) at least two flexible annular sealing rings extending radially outwardly from a side surface of said elastomeric seal body for sealingly engaging an interior surface of said cylindrical bore said sealing rings being spaced from ends of the seal body, said elastomeric seal body being dimensioned and configured to float freely within said cylindrical bore in both a radial and axial direction upon flexure of said annular lips and said annular sealing rings in response to reciprocating movement of said shaft while maintaining sealing engagement with said shaft and said housing, respectively.

2. A floating wiper seal assembly as recited in claim 1, further comprising a bearing associated with said axial bore of said elastomeric seal body for providing guiding contact by said reciprocating shaft.

3. A floating wiper seal assembly as recited in claim 1, wherein said opposed annular lips extend radially inwardly from an inner circumferential surface of said axial bore at an angle to the longitudinal axis of said seal body.

4. A floating wiper seal assembly as recited in claim 1, wherein said annular sealing rings extend radially outwardly from said elastomeric seal body at an angle with respect to the longitudinal axis of said seal body.

5. A floating wiper seal assembly as recited in claim 4, further comprising an annular bearing member embedded in said elastomeric body between said opposed annular lips for providing guiding contact by said reciprocating shaft.

6. A floating wipe r seal assembly as recited in claim 1 wherein said annular sealing rings both extend radially outwardly from said seal body at an acute angle with respect to a first direction of the longitudinal axis of said seal body.

7. A floating wiper seal assembly as recited in claim 1, wherein said annular sealing rings both extend radially outwardly from said seal body at an obtuse angle with respect to a first direction of the longitudinal axis of said seal body.

8. A floating wiper seal assembly as recited in claim 7, wherein said annular lips and said annular sealing rings are formed integral with said elastomeric seal body.

9. A floating wiper seal assembly for sealingly engaging a reciprocating shaft within a fluid-containing housing comprising:

a) an elastomeric seal body configured for reception within a bore of said housing and having a longitudinal bore extending therethrough for receiving s aid reciprocating shaft;

b) a pair of flexible continuous lips extending laterally inwardly from an interior surface of said longitudinal bore for wiping and sealingly engaging said reciprocating shaft;

c) a bearing member disposed between said pair of flexible continuous lips for providing guiding contact by said reciprocating shaft; and d) at least two flexible sealing rings extending laterally outwardly from a side surface of said seal body for sealingly engaging an interior surface of said bore of said housing, said sealing rings sp[]aced from ends of said seal body, said elastomeric seal body being dimensioned and configured to float freely within said bore of said housing in both a longitudinal and a lateral direction upon flexure of said lips and said sealing rings in response to reciprocating movement of said shaft while maintaining sealing engagement with said shaft and housing, respectively.

10. A floating wiper seal assembly as recited in claim 9, wherein said opposed annular lips extend radially inwardly from an inner circumferential surface of said axial bore at an angle to the longitudinal axis of said elastomeric seal body.

11. A floating wiper seal assembly as recited in claim 9, wherein said sealing rings extend laterally outwardly from said elastomeric seal body at an angle with respect to the longitudinal axis of said body.

12. A floating wiper seal assembly as recited in claim 9, wherein said annular bearing member is constructed from a lubricious bearing material.

13. A floating wiper seal assembly as recited in claim 9, wherein said elastomeric seal body, said and said sealing rings are monolithically formed from polyurethane.

14. A fluid-containing pump housing comprising:

a reception bore having an opening and an opposing rearward wall;

a retainer blocking a portion of the opening of the reception bore without preventing the passage of a reciprocating shaft through said reception bore;

a matching bore for loosely receiving the reciprocating shaft extending through said reception bore, the matching bore extending into the housing from the rearward wall of the reception bore in axial alignment with the reception bore, and a floating wiper seal assembly including,
  a) a generally cylindrical elastomeric seal body received within the reception bore of said housing and having an axial bore extending therethrough for receiving said reciprocating shaft, said seal body having a longitudinal axis;
  b) a pair of opposed flexible annular lips extending radially inwardly from an interior surface of said axial bore, for wiping and sealingly engaging said reciprocating shaft; and
  c)
  d) at least two flexible annular sealing rings extending radially outwardly from a side surface of said seal body, sealingly engaging an interior surface of said cylindrical reception bore, said sealing rings spaced from ends of said seal body, said elastomeric body being dimensioned and configured to float freely within said cylindrical bore in both a radial direction within said interior surface of said cylindrical reception bore, and an axial direction between the retainer and the rearward wall of the reception bore upon flexure of said annular lips and said annular sealing rings in response to reciprocating movement of said shaft while maintaining sealing engagement with said shaft and said housing, respectively.

15. A pump housing as recited in claim 14 wherein the floating wiper seal assembly further comprises a bearing associated with said axial bore of said elastomeric seal body for providing guiding contact for said reciprocating shaft.

16. A pump housing as recited in claim 14 wherein said annular sealing rings of said floating wiper seal assembly radially extend at an angle from said seal body.

17. A pump housing as recited in claim 14 wherein said annular sealing rings of said floating wiper seal assembly both extend radially outwardly from said seal body at an acute angle with respect to a first direction of the longitudinal axis of said seal body.

18. A pump housing as recited in claim 14 wherein said annular sealing rings of said floating wiper seal assembly both extend radially outwardly from said seal body at an obtuse angle with respect to a first direction of the longitudinal axis of said seal body.

19. A floating wiper seal assembly as recited in claim 9 wherein said sealing rings both extend laterally outwardly from said seal body at an acute angle with respect to a first direction of the longitudinal axis of said seal body.

20. A floating wiper seal assembly as recited in claim 9 wherein said sealing rings both extend laterally outwardly from said seal body at an obtuse angle with respect to a first direction of the longitudinal axis of said seal body.

* * * * *

UNITED STATES PATENT AND TRADEMARK OFFICE
CERTIFICATE OF CORRECTION

PATENT NO. : 5,897,119
DATED : April 27, 1999
INVENTOR(S) : Ivan L. McMillen

It is certified that error appears in the above-identified patent and that said Letters Patent is hereby corrected as shown below:

Col. 8, line 1, delete -- c) --;

Col. 8, line 2, delete -- d ) -- and substitute therefor -- c) --.

Signed and Sealed this

Eighteenth Day of January, 2000

Attest:

Q. TODD DICKINSON

*Attesting Officer*  *Commissioner of Patents and Trademarks*